(12) United States Patent
Peng et al.

(10) Patent No.: US 12,240,774 B2
(45) Date of Patent: Mar. 4, 2025

(54) METHOD AND DEVICE FOR REALIZING ADVANCED NITROGEN REMOVAL OF MATURE LANDFILL LEACHATE AND SLUDGE REDUCTION BY USING SLUDGE FERMENTATION PRODUCTS AS CARBON SOURCE

(71) Applicant: Beijing University of Technology, Beijing (CN)

(72) Inventors: Yongzhen Peng, Beijing (CN); Jingang Qiu, Beijing (CN); Qiong Zhang, Beijing (CN); Zhong Wang, Beijing (CN); Hao Jiang, Beijing (CN); Shang Ren, Beijing (CN)

(73) Assignee: Beijing University of Technology, Beijing (CN)

(*) Notice: Subject to any disclaimer, the term of this patent is extended or adjusted under 35 U.S.C. 154(b) by 51 days.

(21) Appl. No.: 17/768,668

(22) PCT Filed: Jul. 21, 2021

(86) PCT No.: PCT/CN2021/107611
§ 371 (c)(1),
(2) Date: Apr. 13, 2022

(87) PCT Pub. No.: WO2022/062616
PCT Pub. Date: Mar. 31, 2022

(65) Prior Publication Data
US 2024/0109798 A1 Apr. 4, 2024

(30) Foreign Application Priority Data
Sep. 24, 2020 (CN) .......................... 202011011157.6

(51) Int. Cl.
*C02F 3/30* (2023.01)
*C02F 101/16* (2006.01)
*C02F 103/06* (2006.01)

(52) U.S. Cl.
CPC .............. *C02F 3/307* (2013.01); *C02F 3/303* (2013.01); *C02F 3/305* (2013.01);
(Continued)

(58) Field of Classification Search
CPC .......... C02F 3/307; C02F 3/303; C02F 3/305; C02F 2101/163; C02F 2101/166;
(Continued)

(56) References Cited

FOREIGN PATENT DOCUMENTS

| CN | 103539317 A | 1/2014 |
|---|---|---|
| CN | 105036335 A | 11/2015 |

(Continued)

OTHER PUBLICATIONS

Translation of Wang (CN103539317A)—cited as a foreign reference in IDS (Year: 2014).*

(Continued)

*Primary Examiner* — Ekandra S. Miller-Cruz
(74) *Attorney, Agent, or Firm* — Conley Rose, P.C.; Rodney B. Carroll

(57) ABSTRACT

Disclosed are a method and device for realizing advanced nitrogen removal of mature landfill leachate and sludge reduction by using sludge fermentation products as carbon source, belonging to the field of biological treatment of sludge of high ammonia nitrogen wastewater. The mature landfill leachate first enters a PNA-SBR, the reactor operates in an anoxic/anaerobic/oxic (A/A/O) mode, denitrification is performed at an anoxic state; then anaerobic ammonia oxidation is performed at an anaerobic stage to remove part of ammonia nitrogen and nitrite nitrogen; partial nitrification is performed at an oxic stage to remove the ammonia (Continued)

nitrogen; discharged water is pumped into a DN-SBR, meanwhile, an excess sludge fermentation mixture is added, the reactor operates in an anoxic/anaerobic/oxic (A/A/O) mode, organic matters in the sludge fermentation mixture are used for denitrification at an anoxic stage, and meanwhile, microorganisms store an inner carbon source; ammonia nitrogen brought by the fermentation mixture is removed at an anaerobic stage; and denitrification is performed through the inner carbon source at an oxic stage. The remarkable sludge reduction effect is achieved while a removal rate of TN achieves 96.0%, and the method and the device are suitable for advanced removal of the high ammonia nitrogen wastewater.

2 Claims, 1 Drawing Sheet

(52) U.S. Cl.
CPC .. *C02F 2101/163* (2013.01); *C02F 2101/166* (2013.01); *C02F 2103/06* (2013.01); *C02F 2209/02* (2013.01); *C02F 2209/04* (2013.01); *C02F 2209/06* (2013.01); *C02F 2209/38* (2013.01); *C02F 2305/06* (2013.01)

(58) Field of Classification Search
CPC .............. C02F 2103/06; C02F 2209/02; C02F 2209/04; C02F 2209/06; C02F 2209/38; C02F 2305/06; C02F 3/302; C02F 3/006; C02F 11/04; C02F 2101/16; C02F 2209/22; C02F 3/301
USPC ......................................................... 210/610
See application file for complete search history.

(56) References Cited

FOREIGN PATENT DOCUMENTS

| | | |
|---|---|---|
| CN | 108439595 A | 8/2018 |
| CN | 109485149 A | 3/2019 |
| JP | 2016077954 A | 5/2016 |

OTHER PUBLICATIONS

Translation of Peng (CN109485149A)—cited as foreign reference in the IDS (Year: 2019).*
Foreign Communication from Related Application—International Search Report of the International Searching Authority with English Translation, International Application No. PCT/CN2021/107611, dated Oct. 20, 2021, 12 pages.
Foreign Communication from Related Application—Chinese Office Action with English Translation, CN Patent Application No. 202011011157.6, 10 pages.

* cited by examiner

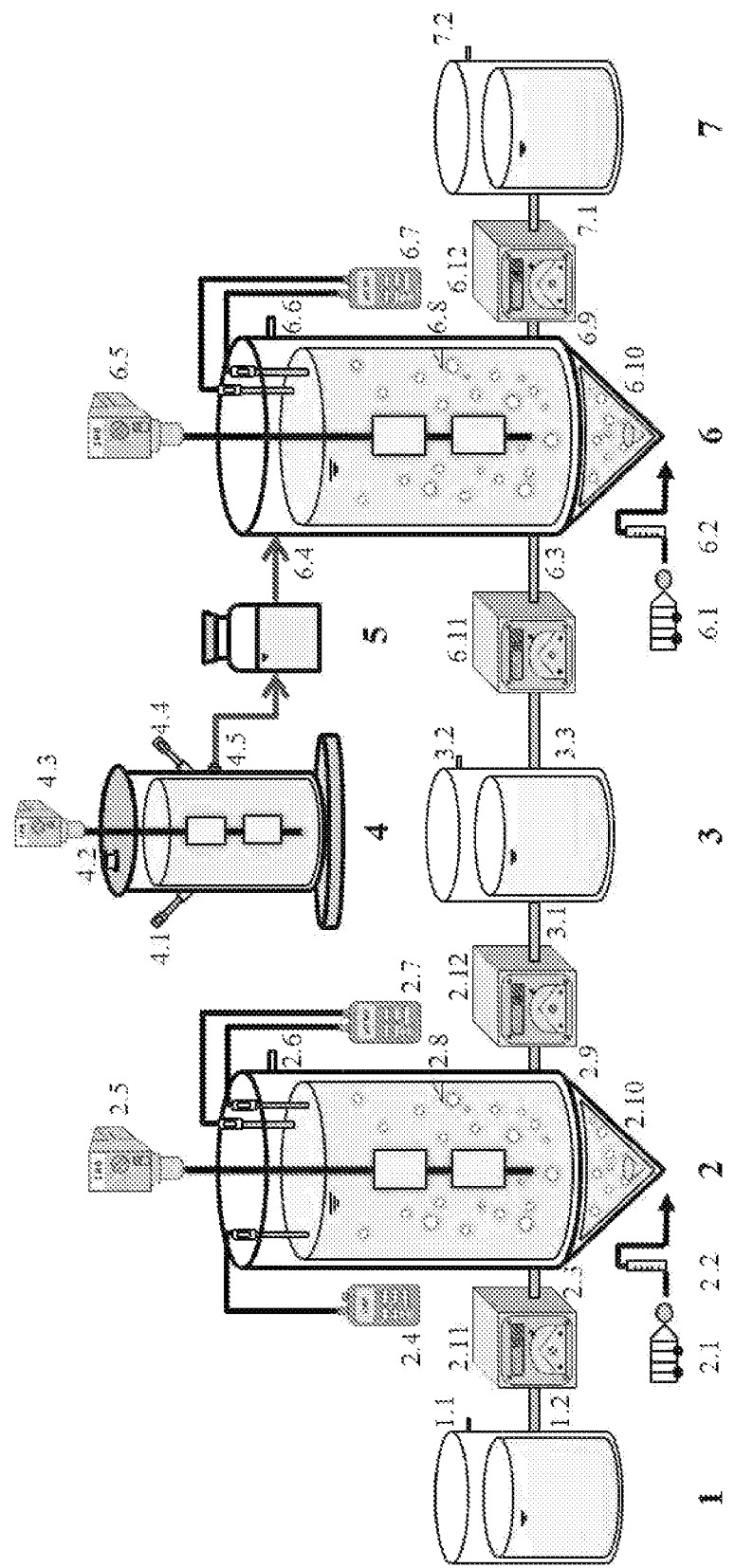

METHOD AND DEVICE FOR REALIZING ADVANCED NITROGEN REMOVAL OF MATURE LANDFILL LEACHATE AND SLUDGE REDUCTION BY USING SLUDGE FERMENTATION PRODUCTS AS CARBON SOURCE

CROSS REFERENCE TO RELATED APPLICATIONS

This application is a filing under 35 U.S.C. 371 of International Application No. PCT/CN2021/107611 filed on Jul. 21, 2021, entitled "METHOD AND EQUIPMENT FOR IMPLEMENTING ADVANCED NITROGEN REMOVAL AND SLUDGE REDUCTION OF OLD LANDFILL LEACHATE BY USING SLUDGE FERMENTATION CARBON SOURCE," which claims priority to Chinese Patent Application No. 202011011157.6, entitled "METHOD AND DEVICE FOR REALIZING ADVANCED NITROGEN REMOVAL OF MATURE LANDFILL LEACHATE AND SLUDGE REDUCTION BY USING SLUDGE FERMENTATION PRODUCTS AS CARBON SOURCE," filed Sep. 24, 2020, which applications are incorporated by reference herein in their entirety.

TECHNICAL FIELD

The present application relates to a method and device for realizing advanced nitrogen removal of mature landfill leachate and excess sludge reduction by using sludge fermentation liquid as carbon source, and belongs to the technical field of biological nitrogen removal of mature landfill leachate with a low carbon-nitrogen ratio.

BACKGROUND

In recent years, with the development of economy and the improvement of people's living standards, the output of municipal solid waste has also continued to increase, and treatment methods include landfill, incineration, and composting. The landfill method has gradually become the most widely used treatment and disposal method in the world due to its simple operation mode. However, the landfill method can also cause harm to the atmosphere, soil, water sources, etc. If leachate produced by the landfill method is not collected in time and properly treated, it will seriously pollute the surface water or groundwater. The landfill leachate is a kind of wastewater containing high concentration of organic matters and ammonia nitrogen, has the characteristics of complex water quality constituents, large changes in water volume, imbalanced ratio of microbial nutrient elements, etc, and will cause serious pollution to the environment, making the treatment of the landfill leachate one of unsolved problems with an international scope. Traditional wastewater biological nitrogen removal converts $NH_4^+-N$ into $NO_3^--N$ through nitrification, and then converts $NO_3^--N$ into nitrogen to escape from water through denitrification. In the denitrification stage, microorganisms use $NO_3^--N$ as an electron acceptor and organic matters as an electron donor, and finally ammonia nitrogen is converted into nitrogen, nitrogen removal is finished, and wastewater is discharged when meeting the emission standards. However, the water quality of landfill leachate varies greatly in different periods. For mature landfill leachate, a carbon source thereof is very small, carbon and nitrogen are relatively low, and a carbon source needed by the microorganisms for denitrification is not met, so the nitrogen removal efficiency of the mature landfill leachate cannot be improved, advanced removal of the mature landfill leachate is difficult to complete by a traditional biological nitrogen removal process, and addition of an organic carbon source will greatly increase the wastewater treatment cost.

Due to the insufficient carbon source, an additional carbon source must be added in the treatment process, which in turn leads to a large increase in heterotrophic bacteria and a large excess sludge output. Therefore, as a by-product of an activated sludge process, the treatment and disposal of a large amount of excess sludge is also another big problem. The excess sludge is rich in organic carbon source. A large amount of short-chain fatty acids can be produced through alkaline anaerobic fermentation, and may be added as a high-quality carbon source to the treatment process of the landfill leachate, and the excess sludge reduces the weight by 50%-60% while providing the carbon source. In terms of operating cost, a sludge fermentation mixture is directly used instead of sludge fermentation liquid produced by centrifugation of a sludge fermentation product, which saves the centrifugal cost of sludge and water separation and saves floor space.

A method and device for realizing advanced nitrogen removal of mature landfill leachate and sludge reduction by using sludge fermentation products as carbon source takes excess sludge and the mature landfill leachate with a high ammonia nitrogen concentration as research objects, and adopts an anoxic/anaerobic/oxic mode in a PNA-SBR for operating. After raw water enters an anoxic stage, organic matters are used to convert the excess part of nitrite nitrogen and nitrate nitrogen in the last cycle into nitrogen; after the water enters an anaerobic stage, an anaerobic ammonia oxidation reaction occurs, and part of ammonia nitrogen and the excess nitrite nitrogen in the raw water are removed at the same time to generate nitrate nitrogen; and then the water enters an oxic stage, the excess ammonia nitrogen is converted into nitrite nitrogen. Discharged water containing nitrite nitrogen and nitrate nitrogen is pumped into a DN-SBR, an excess sludge fermentation mixture is added at the same time, the reactor operates in an anaerobic/oxic/anoxic mode, the carbon source required for denitrification is derived from the excess sludge fermentation mixture on the one hand, and the storage of microorganisms in the anaerobic stage on the other hand, and is released in the anoxic stage. The microorganisms in the activated sludge use two parts of carbon sources for denitrification and remove a nitrogen element from the landfill leachate. According to the process, under the conditions that ammonia nitrogen, total nitrogen and COD concentrations of fed water are 1150±40 mg/L, 1421±55 mg/L and 1503±150 mg/L, the TN removal rate of the discharged water reaches 96.0%. The process uses excess sludge for fermentation as the carbon source, which not only saves the treatment and disposal cost of the excess sludge, but also provides the carbon source for advanced nitrogen removal of wastewater treatment, and can achieve the effect of reducing the excess sludge.

SUMMARY

In view of defects of the prior art, the present application provides a method and device for realizing advanced nitrogen removal of mature landfill leachate and sludge reduction by using sludge fermentation products as carbon source. Specifically, the mature landfill leachate first enters a partial nitrification-Anammox integrated reactor which operates in an anoxic/anaerobic/oxic (A/A/O) mode, and after raw water enters an anoxic stage, organic matters are used to convert an excess part of nitrite nitrogen and nitrate nitrogen in the last cycle into nitrogen; after the water enters an anaerobic stage, an anaerobic ammonia oxidation reaction occurs, and part of ammonia nitrogen and the excess nitrite nitrogen in the raw water are removed at the same time to generate nitrate nitrogen; and then the water enters an oxic stage, the excess ammonia nitrogen is converted into nitrite nitrogen. Discharged water containing nitrite nitrogen and nitrate nitrogen is pumped into a DN-SBR, an excess sludge fermentation mixture is added at the same time, the reactor operates in an anaerobic/oxic/anoxic (A/O/A) mode, the carbon source required for denitrification is derived from the excess sludge fermentation mixture on the one hand, and the storage of microorganisms in the anaerobic stage on the other hand, and is released in the anoxic stage. Two ways of carbon sources are used to reduce a nitrogen element into nitrogen, so as to realize the advanced nitrogen removal of the mature landfill leachate and sludge reduction.

The present application is realized by the following technical solutions:

A device for realizing advanced nitrogen removal of mature landfill leachate and sludge reduction by using sludge fermentation products as carbon source includes: a raw water tank (1), a partial nitrification/anaerobic ammonia oxidation integrated reactor (2), a middle tank (3), an excess sludge alkaline fermentation tank (4), a fermentation product storage tank (5), a denitrification reactor (6), and a water outlet tank (7).

The raw water tank is provided with an overflow pipe (1.1) and a water outlet (1.2); the partial nitrification/anaerobic ammonia oxidation integrated reactor (2) is provided with an air compressor (2.1), a gas flow meter (2.2), an aeration head (2.10), a first water inlet (2.3), a first sampling port (2.8), a first drainage port (2.9), a first blow-down pipe (2.6), a first agitator (2.5), a first water inlet peristaltic pump (2.11), a first water outlet peristaltic pump (2.12), a pH/DO real-time monitoring device (2.7), and an ORP real-time monitoring device (2.4); the excess sludge alkaline fermentation tank (4) is completely sealed and attached with a thermal insulation layer outside, and is provided with a temperature control device (4.1), a first sludge inlet (4.2), a second agitator (4.3), a pH/DO real-time monitoring device (4.4), and a first sludge outlet (4.5); and the denitrification reactor (6) is provided with an air compressor (6.1), a gas flow meter (6.2), an aeration head (6.10), a second water inlet (6.3), a second sampling port (6.8), a second sampling port (6.8), a second drainage port (6.9), a second blow-down pipe (6.6), a third agitator (6.5), a second water inlet peristaltic pump (6.11), a second water outlet peristaltic pump (6.12), and a pH/DO real-time monitoring device (6.7).

The raw water tank (1) is connected with the first water inlet (2.3) of the partial nitrification/anaerobic ammonia oxidation integrated reactor through the first water inlet peristaltic pump (2.11); the first drainage port (2.9) of the partial nitrification/anaerobic ammonia oxidation integrated reactor (2) is connected with a water inlet (3.1) of the middle tank through the first water outlet peristaltic pump (2.12), and air passes through the air compressor (2.1) and the gas flow meter (2.2) and finally is driven into the partial nitrification/anaerobic ammonia oxidation integrated reactor (2) through the aeration head (2.10); a water outlet (3.3) of the middle tank is connected with the denitrification reactor (6) through the second water inlet peristaltic pump (6.11); the first sludge outlet (4.5) of the excess sludge alkaline fermentation tank (4) is connected with the fermentation product storage tank (5); the fermentation product storage tank (5) is connected with a second sludge inlet (6.4) of the denitrification reactor (6); and the water outlet tank (7) is connected with the second drainage port (6.9) of the denitrification reactor through the second water outlet peristaltic pump (6.12).

A method for realizing advanced nitrogen removal of mature landfill leachate and sludge reduction by using a sludge fermentation carbon source through the device includes the following steps:

1) starting an excess sludge alkaline fermentation tank: specifically, the excess sludge alkaline fermentation tank is a semi-batch reactor, sludge residence time SRT is 8-10 days, a temperature is maintained at 35±0.5° C., and pH of a reaction is monitored online and maintained at 10±0.2; and according to an amount of an excess sludge fermentation mixture discharged from the SBR to an excess sludge fermentation mixture storage tank every day, an equal volume of fresh excess sludge is added to the excess sludge alkaline fermentation tank;

2) adding partial nitrification/anaerobic ammonia oxidation activated sludge and denitrification sludge into a partial nitrification/anaerobic ammonia oxidation integrated reactor and a denitrification reactor respectively, and controlling sludge concentrations of mixed liquid in the reactors after adding to be 4000-5000 mg/L and 8000-15000 mg/L respectively;

3) turning on a first water inlet peristaltic pump, and pumping mature landfill leachate in a raw water tank into the partial nitrification/anaerobic ammonia oxidation integrated reactor which operates in an anoxic/anaerobic/oxic (A/A/O) mode, that is, a following mode: after water inflow is completed, turning on a first agitator to enter an anoxic stage, stirring for 1 hour, and converting an excess part of nitrite nitrogen and nitrate nitrogen of the reactor in the last cycle into nitrogen; after biodegradable organic matters in raw water are used up, continuing anoxic stirring for 2 h, generating an anaerobic ammonia oxidation reaction, removing part of ammonia nitrogen and unused nitrite nitrogen in the raw water at the same time, generating nitrate nitrogen, and turning off the first agitator; then turning on a first air compression pump, starting aeration, generating a partial nitrification reaction, converting the ammonia nitrogen into nitrite nitrogen, keeping DO between 1 mg/L and 1.5 mg/L through a real-time control device, monitoring pH in real-time through a pH control device, presetting aeration time of 4-5 h, and stopping aeration at an "ammonia valley point", that is, before an inflection point where the pH first descends and then ascends in a nitrification process; and depositing for 0.5 h to separate sludge from water, turning on a first water outlet peristaltic pump, and discharging the water into an middle tank with a drainage ratio of 30%; and 4) turning on a second water inlet peristaltic pump, pumping nitrite nitrogen and nitrate nitrogen wastewater in the middle tank into the denitrification reactor, and adding an excess sludge fermentation mixture with an amount of 3%-5% of an effective volume of the denitrification reactor at the same time, specifically, the reactor operates in an anaerobic/oxic/anoxic (A/O/A) mode, that is, a following mode: after water inflow is completed, turning on a second agitator to start stirring for 3-4 h, making full use of organic matters in the excess sludge fermentation mixture for denitrification, allowing microorganisms to store an internal carbon source at the same time, and turning on a second air compression pump after stirring is finished; entering an aeration stage, converting ammonia nitrogen brought from the fermentation mixture into nitrite nitrogen, maintaining dissolved oxygen at 0.5-1.5 mg/L through a real-time control device, monitoring pH in real-time through a pH control device, presetting aeration time of 1-2 h, and stopping aeration at an "ammonia valley point", that is, before an inflection point where the pH first descends and then ascends in a nitrification process; and turning on the second agitator again to enter an anoxic stirring stage, at which time the microorganisms release the carbon source stored in an anaerobic stage for denitrification, judging an end point by real-time control, stopping stirring when a "nitrite elbow" inflection point occurs, that is, $\Delta pH=pH2-pH1<0$, depositing for 0.5 h to separate sludge from water, turning on a second water outlet peristaltic pump, and pumping supernatant into a water outlet tank with a drainage ratio of 30%.

The mature landfill leachate first enters the PNA-SBR which operates in the A/A/O mode, and after the raw water enters the anoxic stage, the organic matters are used to convert an excess part of nitrite nitrogen and nitrate nitrogen in the last cycle into nitrogen; after the water enters the anaerobic stage, the anaerobic ammonia oxidation reaction occurs, and part of ammonia nitrogen and the excess nitrite nitrogen in the raw water are removed at the same time to generate nitrate nitrogen; and then the water enters the oxic stage, the excess ammonia nitrogen is converted into nitrite nitrogen. The discharged water containing nitrite nitrogen and nitrate nitrogen is pumped into the DN-SBR, the excess sludge fermentation mixture is added at the same time, the reactor operates in the A/O/A mode, after the water enters the anaerobic section, part of the organic matters in the sludge fermentation mixture are used to first denitrify nitrite nitrogen and nitrate nitrogen in the fed water, and the microorganisms store the internal carbon source; at the oxic section, the ammonia nitrogen produced in the fermentation mixture is converted into the nitrite nitrogen and the nitrate nitrogen; and at the final anoxic stage, the nitrite nitrogen and the nitrate nitrogen are reduced to nitrogen, and advanced removal of the nitrogen element and reduction of the excess sludge are completed in the denitrification reactor at the same time.

The device and method for realizing advanced nitrogen removal of mature landfill leachate and sludge reduction by using sludge fermentation products as carbon source according to the present application have the following advantages:

(1) The present application realizes the true advanced nitrogen removal of the mature landfill leachate through the organic combination of partial nitrification, anaerobic ammonia oxidation, excess sludge fermentation and endogenous denitrification, and achieves the effects of cost saving, advanced nitrogen removal and sludge reduction.

(2) In the partial nitrification/anaerobic ammonia oxidation integrated reactor, the partial nitrification of ammonia oxidation bacteria can save 60% of aeration volume, and the anaerobic ammonia oxidation bacteria do not generate N2O in the metabolic process, so the process has less greenhouse gas for emission.

(3) In the partial nitrification/anaerobic ammonia oxidation integrated reactor, both the partial nitrification reaction and the anaerobic ammonia oxidation process may be carried out. Compared with a traditional two-stage process of partial nitrification coupled with anaerobic ammonia oxidation, the device is simple and easy to operate.

(4) In the denitrification reactor, the carbon source needed for the reaction is from the internal carbon source stored in the anaerobic stage on the one hand, and from the added excess sludge fermentation mixture on the other hand, which achieves "zero addition" of carbon sources and greatly saves the required cost.

(5) The process does not have a reflow device, which saves the cost and is easy to operate.

BRIEF DESCRIPTION OF THE DRAWINGS

FIG. 1 is a flow chart of a method and device for realizing advanced nitrogen removal of mature landfill leachate and sludge reduction by using sludge fermentation products as carbon source.

DETAILED DESCRIPTION

The present application will be further described in detail below with reference to the accompanying drawings and specific implementations.

As shown in FIG. 1, a device and method for realizing advanced nitrogen removal of mature landfill leachate and sludge reduction by using sludge fermentation products as carbon source, include a raw water tank (1), a partial nitrification/anaerobic ammonia oxidation integrated reactor (2), a middle tank (3), an excess sludge alkaline fermentation tank (4), a fermentation product storage tank (5), a denitrification reactor (6), and a water outlet tank (7).

The raw water tank is provided with an overflow pipe (1.1) and a water outlet (1.2); the partial nitrification/anaerobic ammonia oxidation integrated reactor (2) is provided with an air compressor (2.1), a gas flow meter (2.2), an aeration head (2.10), a first water inlet (2.3), a first sampling port (2.8), a first drainage port (2.9), a first blow-down pipe (2.6), a first agitator (2.5), a first water inlet peristaltic pump (2.11), a first water outlet peristaltic pump (2.12), a pH/DO real-time monitoring device (2.7), and an ORP real-time monitoring device (2.4); the excess sludge alkaline fermentation tank (4) is completely sealed and attached with a thermal insulation layer outside, and is provided with a temperature control device (4.1), a first sludge inlet (4.2), a second agitator (4.3), a pH/DO real-time monitoring device (4.4), and a first sludge outlet (4.5); and the denitrification reactor (6) is provided with an air compressor (6.1), a gas flow meter (6.2), an aeration head (6.10), a second water inlet (6.3), a second sampling port (6.8), a second sampling port (6.8), a second drainage port (6.9), a second blow-down pipe (6.6), a third agitator (6.5), a second water inlet peristaltic pump (6.11), a second water outlet peristaltic pump (6.12), and a pH/DO real-time monitoring device (6.7).

The raw water tank (1) is connected with the first water inlet (2.3) of the partial nitrification/anaerobic ammonia oxidation integrated reactor through the first water inlet peristaltic pump (2.11); the first drainage port (2.9) of the partial nitrification/anaerobic ammonia oxidation integrated reactor (2) is connected with a water inlet (3.1) of the middle tank through the first water outlet peristaltic pump (2.12), and air passes through the air compressor (2.1) and the gas flow meter (2.2) and finally is driven into the partial nitrification/anaerobic ammonia oxidation integrated reactor (2) through the aeration head (2.10); a water outlet (3.3) of the middle tank is connected with the denitrification reactor (6)

through the second water inlet peristaltic pump (6.11); the first sludge outlet (4.5) of the excess sludge alkaline fermentation tank (4) is connected with the fermentation product storage tank (5); the fermentation product storage tank (5) is connected with a second sludge inlet (6.4) of the denitrification reactor (6); and the water outlet tank (7) is connected with the second drainage port (6.9) of the denitrification reactor through the second water outlet peristaltic pump (6.12).

The specific operation process is as follows:

1) an excess sludge alkaline fermentation tank is started: specifically, the excess sludge alkaline fermentation tank is a semi-batch reactor, sludge residence time SRT is 8-10 days, a temperature is maintained at 35±0.5° C., and pH of a reaction is monitored online and maintained at 10±0.2; and according to an amount of an excess sludge fermentation mixture discharged from the SBR to an excess sludge fermentation mixture storage tank every day, an equal volume of fresh excess sludge is added to the excess sludge alkaline fermentation tank;

2) partial nitrification/anaerobic ammonia oxidation activated sludge and denitrification sludge are added into a partial nitrification/anaerobic ammonia oxidation integrated reactor and a denitrification reactor respectively, and sludge concentrations of mixed liquid in the reactors after adding are controlled to be 4000-5000 mg/L and 8000-15000 mg/L respectively;

3) a first water inlet peristaltic pump is turned on, and mature landfill leachate in a raw water tank is pumped into the partial nitrification/anaerobic ammonia oxidation integrated reactor which operates in an anoxic/anaerobic/oxic (A/A/O) mode, that is, a following mode: after water inflow is completed, a first agitator is turned on to enter an anoxic stage, stirring is performed for 1 hour, and an excess part of nitrite nitrogen and nitrate nitrogen of the reactor in the last cycle are converted into nitrogen; after biodegradable organic matters in raw water are used up, anoxic stirring continues for 2 h, an anaerobic ammonia oxidation reaction occurs, part of ammonia nitrogen and unused nitrite nitrogen in the raw water are removed at the same time, nitrate nitrogen is generated, and the first agitator is turned off; then a first air compression pump is turned on, aeration is started, a partial nitrification reaction occurs, the ammonia nitrogen is converted into nitrite nitrogen, DO is kept between 1 mg/L and 1.5 mg/L through a real-time control device, pH is monitored in real-time through a pH control device, aeration time of 4-5 h is preset, and aeration is stopped at an "ammonia valley point", that is, before an inflection point where the pH first descends and then ascends in a nitrification process; and depositing is performed for 0.5 h to separate sludge from water, a first water outlet peristaltic pump is turned on, and the water is discharged into an middle tank with a drainage ratio of 30%; and 4) a second water inlet peristaltic pump is turned on, nitrite nitrogen and nitrate nitrogen wastewater in the middle tank is pumped into the denitrification reactor, and an excess sludge fermentation mixture with an amount of 3%-5% of an effective volume of the denitrification reactor is added at the same time, specifically, the reactor operates in an anaerobic/oxic/anoxic (A/O/A) mode, that is, a following mode: after water inflow is completed, a second agitator is turned on to start stirring for 3-4 h, organic matters in the excess sludge fermentation mixture are fully used for denitrification, microorganisms store an internal carbon source at the same time, and a second air compression pump is turned on after stirring is finished; the water enters an aeration stage, ammonia nitrogen brought from the fermentation mixture is converted into nitrite nitrogen, dissolved oxygen is maintained at 0.5-1.5 mg/L through a real-time control device, pH is monitored in real-time through a pH control device, aeration time of 1-2 h is preset, and aeration is stopped at an "ammonia valley point", that is, before an inflection point where the pH first descends and then ascends in a nitrification process; and the second agitator is turned on again to enter an anoxic stirring stage, at which time the microorganisms release the carbon source stored in an anaerobic stage for denitrification, judging an end point by real-time control, stirring is stopped when a "nitrite elbow" inflection point occurs, that is, $\Delta pH = pH2 - pH1 < 0$, depositing is performed for 0.5 h to separate sludge from water, a second water outlet peristaltic pump is turned on, and supernatant is pumped into a water outlet tank with a drainage ratio of 30%.

A continuous test result shows:

After the process runs stably, under the conditions that ammonia nitrogen, total nitrogen and COD concentrations of the fed water are 1150±40 mg/L, 1421±55 mg/L and 1503±150 mg/L, the TN removal rate reaches 96.0%, and the TN removal speed can reach 0.64 kg/(m3·d).

What is claimed is:

1. A device for realizing advanced nitrogen removal of mature landfill leachate and sludge reduction by using a sludge fermentation carbon source, wherein the device comprises: a raw water tank, a partial nitrification and anaerobic ammonia oxidation integrated reactor, a middle tank, an excess sludge alkaline fermentation tank, a fermentation product storage tank, a denitrification reactor, and a water outlet tank; the raw water tank is provided with an overflow pipe and a water outlet; the partial nitrification and anaerobic ammonia oxidation integrated reactor is provided with an air compressor, a gas flow meter, an aeration head, a first water inlet, a first sampling port, a first drainage port, a first blow-down pipe, a first agitator, a first water inlet peristaltic pump, a first water outlet peristaltic pump, a first pH and DO real-time monitoring device, and an ORP real-time monitoring device; the excess sludge alkaline fermentation tank is completely sealed and attached with a thermal insulation layer outside, and is provided with a temperature control device, a first sludge inlet, a second agitator, a second pH and DO real-time monitoring device, and a first sludge outlet; the denitrification reactor is provided with an air compressor, a gas flow meter, an aeration head, a second water inlet, a second sampling port, a second drainage port, a second blow-down pipe, a third agitator, a second water inlet peristaltic pump, a second water outlet peristaltic pump, and a third pH and DO real-time monitoring device; the raw water tank is connected with the first water inlet of the partial nitrification and anaerobic ammonia oxidation integrated reactor through the first water inlet peristaltic pump; the first drainage port of the partial nitrification and anaerobic ammonia oxidation integrated reactor is connected with a water inlet of the middle tank through the first water outlet peristaltic pump, and air passes through the air compressor and the gas flow meter and finally is driven into the partial nitrification and anaerobic ammonia oxidation integrated reactor through the aeration head; a water outlet of the middle tank is connected with the denitrification reactor through the second water inlet peristaltic pump; the first sludge outlet of the excess sludge alkaline fermentation tank is connected with the fermentation product storage tank; the fermentation product storage tank is connected with a second sludge inlet of the denitrification reactor; and the water outlet tank is connected with the second drainage port of the denitrification reactor through the second water outlet peristaltic pump.

2. A method for realizing advanced nitrogen removal of mature landfill leachate and sludge reduction by using a sludge fermentation carbon source through the device of claim 1, wherein the method comprises the following steps: 1) starting an excess sludge alkaline fermentation tank: specifically, the excess sludge alkaline fermentation tank is a semi-batch reactor, sludge residence time SRT is 8-10 days, a temperature is maintained at 35+0.5° C., and pH of a reaction is monitored online and maintained at 10+0.2; and according to an amount of an excess sludge fermentation mixture discharged from a sequencing batch reactor to an excess sludge fermentation mixture storage tank every day, an equal volume of fresh excess sludge is added to the excess sludge alkaline fermentation tank; 2) adding partial nitrification and anaerobic ammonia oxidation activated sludge and denitrification sludge into a partial nitrification and anaerobic ammonia oxidation integrated reactor and a denitrification reactor respectively, and controlling sludge concentrations of mixed liquid in the partial nitrification and anaerobic ammonia oxidation integrated reactor and the denitrification reactor after adding to be 5000-7000 mg/L and 8000-15000 mg/L respectively; 3) turning on a first water inlet peristaltic pump, and pumping mature landfill leachate in a raw water tank into the partial nitrification and anaerobic ammonia oxidation integrated reactor which operates in an anoxic and anaerobic and oxic mode, that is, a following mode: after water inflow is completed, turning on a first agitator to enter an anoxic stage and stirring for 1 hour; after biodegradable organic matters in raw water are used up, continuing anoxic stirring for 2 h, and then turning off the first agitator; then turning on a first air compression pump, starting aeration, keeping DO between 1 mg/L and 1.5 mg/L through a real-time control device, and monitoring pH in real-time through a pH control device, presetting aeration time of 4-5 h, and stopping aeration at an "ammonia valley point", that is, before an inflection point where the pH first descends and then ascends in a nitrification process; and depositing for 0.5 h to separate sludge from water, turning on a first water outlet peristaltic pump, and discharging the water into an middle tank with a drainage ratio of 30%; and 4) turning on a second water inlet peristaltic pump, pumping nitrite nitrogen and nitrate nitrogen wastewater in the middle tank into the denitrification reactor, and adding an excess sludge fermentation mixture with an amount of 3%-5% of an effective volume of the denitrification reactor at the same time, specifically, the denitrification reactor operates in an anaerobic and oxic and anoxic mode, that is, a following mode: after water inflow is completed, turning on a second agitator to start stirring for 3-4 h, and turning on a second air compression pump after stirring is finished; entering an aeration stage, maintaining dissolved oxygen at 0.5-1.5 mg/L through a real-time control device, and monitoring pH in real-time through a pH control device, presetting aeration time of 1-2 h, and stopping aeration at an "ammonia valley point", that is, before an inflection point where the pH first descends and then ascends in a nitrification process; and turning on the second agitator again to enter an anoxic stirring stage, at which time microorganisms release the sludge fermentation carbon source stored in an anaerobic stage for denitrification, judging an end point by real-time control of a process, stopping stirring when a "nitrite elbow" inflection point occurs, that is, $\Delta pH=pH2-pH1<0$, depositing for 0.5 h to separate sludge from water, turning on a second water outlet peristaltic pump, and pumping supernatant into a water outlet tank with a drainage ratio of 30%.

* * * * *